United States Patent [11] 3,580,992

[72] Inventors Yasuhito Eguchi
Tokyo;
Yoshio Fujiwara; Takaaki Tohma,
Kanagawa-Ken, Japan
[21] Appl. No. 738,029
[22] Filed June 18, 1968
[45] Patented May 25, 1971
[73] Assignee Sony Corporation
Tokyo, Japan
[32] Priority June 19, 1967, July 22, 1967
[33] Japan
[31] 42/39,158 and Utility 42/63,429

[54] MULTI-HEAD MAGNETIC RECORDING AND REPRODUCING DEVICE FOR VIDEO SIGNALS FEATURING HEAD SWITCHING IN THE RECORD MODE

6 Claims, 8 Drawing Figs.

[52] U.S. Cl. .......... 178/6.6HS
[51] Int. Cl. .......... H04m 5/78
[50] Field of Search .......... 179/100.2
(T); 178/6.6 (A), 6.6 (HS), 6.6 (SF), 6.6 (DO)

[56] References Cited
UNITED STATES PATENTS

| | | | |
|---|---|---|---|
| 2,916,546 | 12/1959 | Ginsburg et al. .......... | 178/6.6 |
| 2,968,692 | 1/1961 | Ginsburg et al. .......... | 178/6.6 |
| 3,152,226 | 10/1964 | Stratton .......... | 178/6.6 |
| 3,359,365 | 12/1967 | Kihara .......... | 178/6.6 |

*Primary Examiner*—Bernard Konick
*Assistant Examiner*—Robert S. Tupper
*Attorneys*—Albert C. Johnston, Robert E. Isner, Lewis H. Eslinger and Alvin Sinderbrand

ABSTRACT: In a magnetic recording and reproducing device having two rotary magnetic heads for recording and reproducing signals, such as video signals, in skew tracks traced across a magnetic tape by the heads, a switching circuit is provided which, during recording, alternately supplies the video signals to the heads in synchronism with the vertical synchronizing pulses included in the video signals. The video signals thus recorded in successive tracks have overlapping portions which either correspond to a very short recording period of the order of one horizontal period of the video signal and are contained in the vertical blanking period of the signal, or one of such overlapping portions is recorded at a substantially lower level than the other. In reproducing the video signals thus recorded, the outputs of the heads are merely combined.

INVENTOR.
Yasuhito Eguchi
Yoshio Fujisawa
Takaaki Tohma

BY
ATTORNEYS

INVENTOR.
Yasuhito Eguchi
Yoshio Fujisawa
Takaaki Tohma
BY
ATTORNEYS

INVENTOR.
Yasuhito Eguchi
Yoshio Fujisawa
Takaaki Tohma
BY
ATTORNEYS

INVENTOR.
Yasuhito Eguchi
Yoshio Fujisawa
Takaaki Tohma

BY ATTORNEYS

INVENTOR.
Yasuhito Eguchi
Yoshio Fujisawa
Takaaki Tohma

BY
ATTORNEYS

MULTI-HEAD MAGNETIC RECORDING AND REPRODUCING DEVICE FOR VIDEO SIGNALS FEATURING HEAD SWITCHING IN THE RECORD MODE

This invention relates to a magnetic recording and reproducing device and has more particular reference to an improved recording system for use therewith.

There has heretofore been well known in the art a magnetic recording and reproducing device employing, for example, two rotary magnetic heads, which is adapted such that video signals are recorded on a magnetic tape while forming one magnetic track by one head for every odd number field of the video signal and one magnetic track by the other head for every even number field. Generally, in such a device there is a period during which the both rotary magnetic heads simultaneously engage the magnetic tape, so that the beginning and terminating portions of each magnetic track have contained therein the same information content as that of adjacent tracks. When the signals separately recorded are reproduced by the two heads and are combined together to form the composite signal the reproduction of the signal overlapped portions leads to beat noise generation to introduce unstability in the reproduced picture. To avoid this, it is the practice in the prior art that during playback the outputs of the two magnetic heads are alternately changed over my a switching circuit in a manner not to overlap to provide a continuous signal. With this method, however, it is very difficult to adequately control the timing of the switching operation with the synchronizing signal of the reproduced signal being used as a reference, since jitter may appear in the reproduced signal, and this necessitates the use of a complicated servosystem in the prior art device for preventing the jitter generation. Consequently, the device becomes bulky and heavy and hence is not suitable for general use.

Contrary to the above, in accordance with this invention, during recording, input video signals are switched by a switching circuit so as to be sequentially fed to magnetic heads which record on a magnetic tape signals which do not overlap except in the vertical blanking period of the video signal, or which the period of overlap are at substantially different levels, and thereafter the recorded signals are reproduced sequentially by the heads without changes. Since the input video signals are usually television signals or camera signals and do not contain jitter, production of timing signals for controlling the switching circuit which accurately correspond to the synchronizing signal of the input video signals as a reference can readily be achieved merely by a simple electric circuit structure. Consequently, the reproduction of the recorded signals does not require the use of the switching circuit and the complicated servosystem of the prior art, so that the device of this invention is suitable for use with ordinary video tape recorders. Further, if a magnetic tape is presented according to this invention, its playback can be accomplished with a very simple device.

Accordingly, it is one object of this invention to provide a magnetic recording and reproducing device employing a plurality of magnetic heads and in which signals to be recorded are sequentially alternately applied to the heads and recorded thereby in respective record tracks with a minimum overlapped signal being included therein.

It is another object of this invention to provide a magnetic recording and reproducing device employing a plurality of magnetic heads and in which signals to be recorded are sequentially applied to the heads and recorded thereby in respective record tracks, with any overlapped portions of the recorded signals having levels that are different from each other.

It is still another object of this invention to provide a magnetic recording and reproducing device employing a plurality of magnetic heads and a switching circuit for sequentially applying signals to be recorded to the heads.

Other objects, features and advantages will become apparent from the following description taken in conjunction with the accompanying drawings, in which.

In a magnetic recording and reproducing device employing two rotary magnetic heads for recording video signals on a magnetic tape, and in which each odd number field of the video signal is recorded in a respective track on the tape scanned by one of the heads and each even number field is similarly recorded in a respective track on the tape scanned by the other head, it is practically unavoidable that, as either one of the heads comes into contact with the magnetic tape and the other head runs out of contact with the magnetic tape, there will be a short period of time when the two rotary magnetic heads simultaneously engage the magnetic tape. As a result of this, in the reproduction of the signals recorded by such a device signals a little longer in duration than one field are sequentially reproduced from alternate magnetic tracks scanned by one rotary magnetic head as at 1*a*, 2*a* ..., in FIG. 2A, while the signals sequentially reproduced from the intermediate magnetic tracks scanned by the other rotary magnetic head are similarly longer in duration than one field, as at 1*b*, 2*b* ---, in FIG. 2B. In such case the termination of the reproduced signal, for example, the signal 1*a*, by the one rotary magnetic head and the beginning of the reproduced signal, for example, the signal 1*b*, by the other rotary magnetic head overlap in time. When the reproduced signals from the two rotary magnetic heads are combined to form a composite signal, beat noise is generated in a period from a time $t_1$ to $t_2$, which is likely to disturb the synchronization. In order to avoid this, it is the practice in the prior art to eliminate the overlapped signal portion in the time $t_1$ to $t_2$ through the use of a switching circuit operative during playback, thereby obtaining a video signal which provides a stable reproduced picture. This requires, in addition to such a switching circuit, a circuit for generating switching signals for controlling the switching circuit and so on, and consequently the device inevitably becomes complicated in construction. Further, the switching from one to the other of the signals from the two rotary magnetic heads is required to be effected in the blanking period of the video signal but the blanking period of the reproduced video signals is made to vary in position by jitter or the like, so that maintenance of agreement of the timing of the switching signal with the blanking period requires further complexity in the structure of the device.

Figure 1:
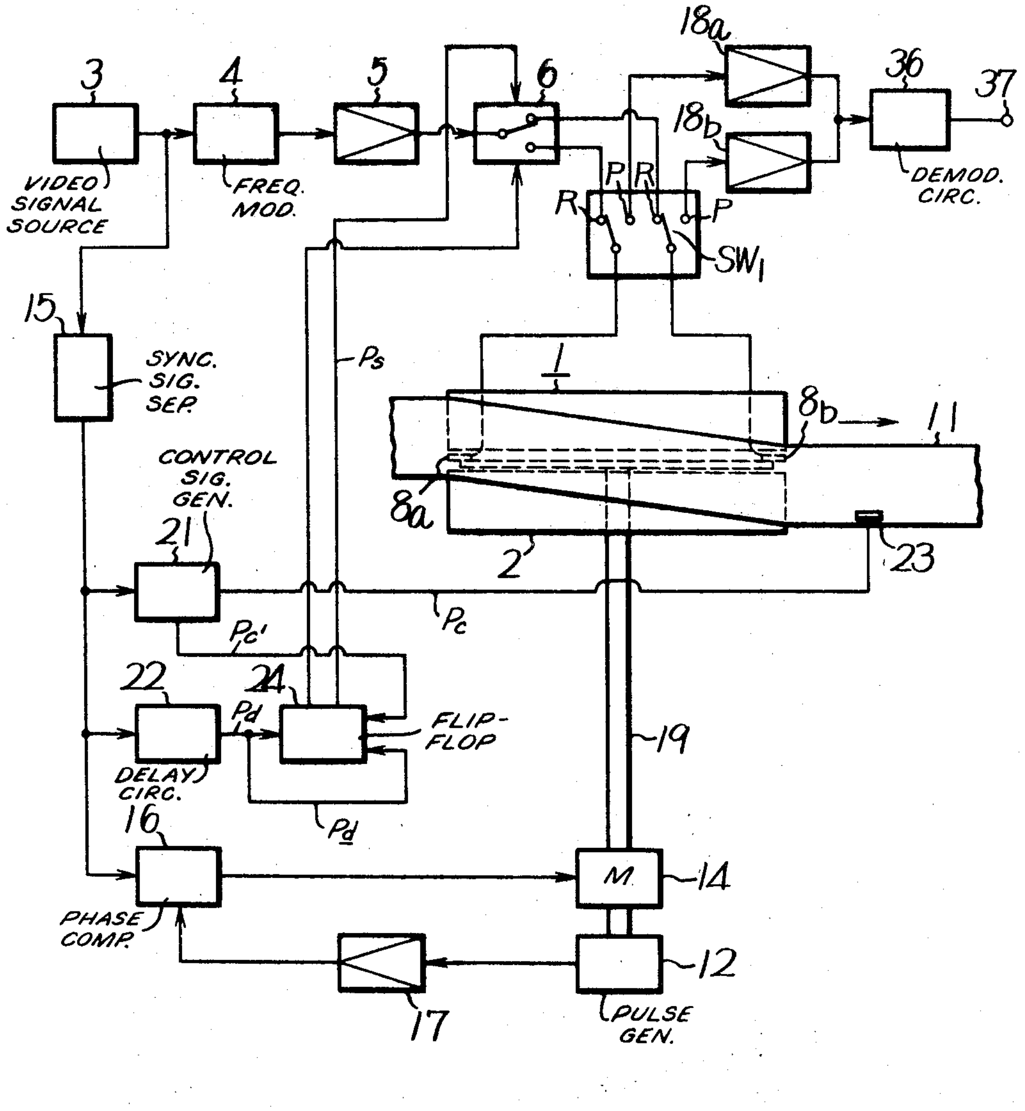
FIG. 1 is a block diagram illustrating one example of a magnetic recording and reproducing device according to this invention.
Figure 2:
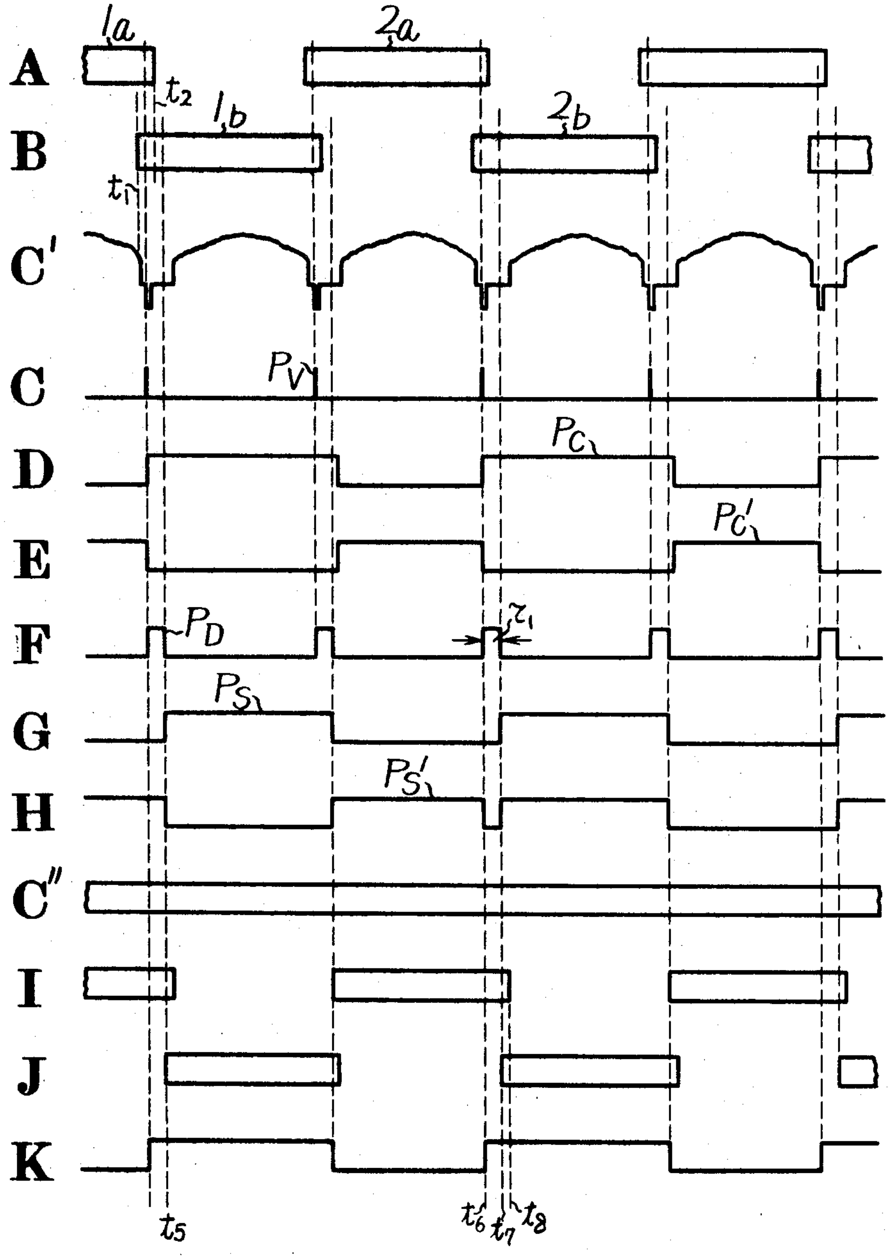
FIG. 2 is a schematic diagram for explaining the magnetic recording and reproducing device exemplified in FIG. 1.

In accordance with this invention, during recording a video signal emanating from a video signal source 3 is frequency-modulated, for example, by a modulator circuit 4 and, if necessary, it is then applied through an amplifier 5 to a switching circuit 6, as illustrated in FIG. 1. In the switching circuit 6 the signal applied thereto from the amplifier circuit 5 is switched, for example, in response to a vertical synchronizing signal of the video signal or a signal related thereto, so as to be alternately applied to rotary magnetic heads 8*a* and 8*b*. This makes it necessary that the switching circuit 6 be supplied with a switching signal synchronized with the vertical synchronizing signal of the video signal without containing substantial fluctuations (that is, jitter) relative to the vertical synchronizing signal of the video signal. In order to obtain such switching signal, a vertical synchronizing signal Pv such as is depicted in FIG. 2C, is separated from a video signal as shown in FIG. 2 C′ by a synchronizing signal separator circuit 15, and is applied to a control signal generator circuit 21 and a monostable multivibrator delay circuit 22. The control signal generator circuit 21 produces a control signal pulse P*c* of 30 c/s, such as is shown in FIG. 2D, whose on-periods are synchronized with alternate pulses of the vertical synchronizing signal P*v* and are equal to or a little longer in duration than one field period. The control signal pulse P*c* is fed to a fixed magnetic head 23 held in contact with one marginal portion of a magnetic tape 11 to be recorded thereon as a control signal. Another output of the control signal generator circuit 21 is a signal P*c*′, such as is depicted in FIG. 2E, which is opposite in sense to the control signal P*c* and the signal P*c*′ is fed to one input terminal of a flip-flop circuit 24. To two input terminals of the flip-flop circuit 24 is applied a delayed signal P*d*, such as is shown in FIG. 2F, which is produced by delaying the vertical synchronizing signal P*v* in the delay circuit 22. The flip-flop circuit 24 is driven by the fall of the delayed signal pulses P*d*, providing a switching signal P*s*, such as is shown in FIG. 2G. The switching signal P*s* thus obtained is applied to the switching circuit 6. It is preferred to establish the delay time of the delay circuit 22 in such a manner that the rise and fall of the switching signal P*s* may respectively agree with the vertical blanking periods immediately following the vertical synchronizing pulses P*v*. During reproduction of signals on tape 11, the contact of the magnetic heads 8*a* and 8*b* with the magnetic tape 11 and the control signal P*c* are always held in a predetermined relation, and the reproduction of the recorded video signal is achieved in accordance with the control signal P*c* so that the magnetic heads 8*a* and 8*b* are actuated to scan predetermined magnetic tracks respectively. For example, if during recording a signal P*s*′ of opposite polarity to the switching signal P*s* is obtained for some reason or other from the flip-flop circuit 24 at a time $t_5$ as depicted in FIG. 2H, the aforementioned signal P*c*′ is applied to the flip-flop circuit 24 from the control signal generator circuit 21 as described above, by which the flip-flop circuit 24 is altered to the off state at the decay of the signal P*c*′, if the circuit 24 has been theretofore held in the on state. By the fall of the pulse P*c*′ after the time $t_5$, the flip-flop circuit 24 is inverted at a time $t_6$, after which the flip-flop circuit 24 is inverted again by the decay of the pulse of the delayed signal P*d* delayed $t_1$ behind $t_6$, thus providing a switching signal of the same polarity as the switching signal P*s* depicted in FIG. 2G after the time $t_7$ at which the flip-flop circuit 24 has been inverted.

With the switching signal P*s* thus obtained, the switching circuit 6 is controlled, so that upon application of a certain field of the video signal to the rotary magnetic head 8*a*, the video signal of the subsequent field is switched to be fed to the other rotary magnetic head 8*b*. These rotary magnetic heads 8*a* and 8*b* are designed so that the signals fed thereto may overlap a little in time at the time of this switching operation, that is, immediately before interruption of the recording by one magnetic head and initiation of the recording by the other head.

Figure 3:
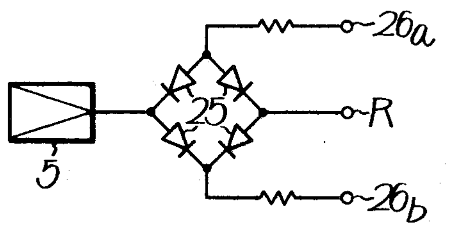
FIG. 3 is a connection diagram showing one example of a switching circuit employed in FIG. 1.

This may be accomplished by means of a switching circuit, for example, as illustrated in FIG. 3. In the illustrated example four diodes 25 having a relatively great storage effect in respect of minority carriers are connected in the form of a bridge circuit and the switching signal Ps such as shown in FIG. 2G is applied to one of a pair of balanced points, that is, one input terminal 26*a* and a signal opposite in polarity to the signal P*s* is fed to the other input terminal 26*b*. Further, one of another pair of balanced points is connected to the output side of the video signal amplifier circuit 5, while the other of the last mentioned balanced points is connected to one of the terminals or record contacts R of a changeover switch $SW_1$ leading to a respective one of the rotary magnetic heads, for instance, the head 8*a*. A similar circuit is interposed between the amplifier circuit 5 and the other terminal R of switch SW, leading to rotary magnetic head 8*b*. However, the switching signals respectively fed to the two diode bridge circuits are displaced 180° apart in phase, that is, opposite in polarity. With such an arrangement, the diodes 25 are rendered conductive by the switching signal P*s* and even after the decay of the signal P*s* the switching circuit is held in the on state for a little while due to the minority carrier storage effect of the diodes 25, so that the video signal is applied to the respective contact or terminal R for this short period of time. In this manner, even after the polarity of the switching circuit has been inverted, the switching circuit is still maintained conductive for a certain period of time, during which the other switching circuit is also put in the on state, with the result that while the storage effect is being maintained both rotary magnetic heads 8*a* and 8*b* are supplied with the video signal. That is, a signal C″ such as shown in FIG. 2C″ which is a frequency-modulated signal of the video signal C′ is recorded and is constituted by the signals shown in FIGS. 2I and 2J which are supplied to heads 8*a* and 8*b*, respectively, and partly overlapped in time for a period of time from $t_7$ to $t_8$. This overlapping period is equivalent to one horizontal period of the video signal at longest and is usually less than several microseconds in duration.

Figure 4:
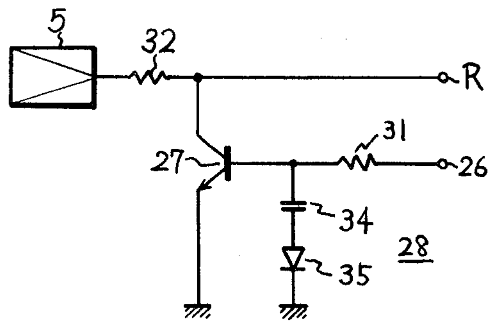
FIGS. 4 and 5 are connection diagrams illustrating other examples of the switching circuit.

When feeding of the video signals to one or the other of the rotary magnetic heads is interrupted abruptly, such head is magnetized, in which case there is the possibility that, during subsequent playback or reproducing by the magnetized head, previously recorded signals are erased thereby. To avoid this, switching of the signal from one to the other of the rotary magnetic heads 8*a* and 8*b* is carried out gradually to such as extent as not to cause magnetization of the heads. This may be achieved advantageously by suitably shaping the waveform of the switching signal to gradually render the changeover switch conductive or nonconductive. To this end, as shown on FIG. 4, the switching circuit for one of the heads may include a switching transistor 27 interposed between the amplifier circuit 5 and the record contact R of the changeover switch $SW_1$ in a shunt configuration, and the above-mentioned switching is effected by controlling the transistor 27 to be conductive or nonconductive. Further a time-constant circuit 28 is connected to the base of the transistor 27. For example, as shown, the base of the transistor 27 is connected to an input terminal 26 for the switching signal Ps through a resistor 31, and the base is further connected to ground through a capacitor 34 and a diode 35. In addition, a resistor 32 is inserted between the connecting point of the collector of the transistor 27 with the contact R and the amplifier circuit 5, while the emitter of the transistor 27 is grounded. The switching signal P*s* is applied to the base of the transistor 27 through the resistor 31. A similar circuit is interposed between the amplifier circuit 5 and the contact R of the changeover switch $SW_1$ for the other rotary magnetic head. In this case these circuits, each having the arrangement shown on FIG. 4, are supplied with switching signals of opposite polarities. The time-constant circuits 28 are dimensioned so that the time constant for rendering the transistor 27 conductive is great and that for making it nonconductive is relatively small. As a result of the foregoing before the conduction of the one switching transistor is achieved the other transistor becomes nonconductive to allow overlapping of the switching operation. Further, in this case, switching of the transistor 27 to its nonconductive state is rapidly achieved but control for rendering it conductive is gradually effected due to the presence of the time-constant circuits. Thus, at the start of the recording of the video signal by one of the heads, such signal is rapidly fed to the magnetic head and, at the end of recording by that head, the signal being fed to the head is gradually removed, ensuring avoidance of the magnetization of the head.

In FIG. 1 reference numeral 1 designates a rotary head assembly, 2 a cylindrical tape guide member, 19 a rotary shaft of the rotary head assembly, 14 a motor, 12 a pulse generator affixed to the rotary shaft 19, 17 an amplifier, and 16 a phase comparator circuit.

Figure 5:
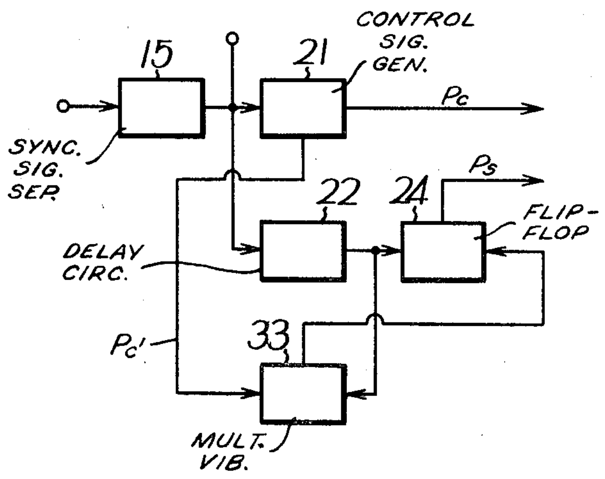

Alternatively, the switching signal Ps may be generated by means of the circuit shown in FIG. 5, in which similar elements to those in FIG. 1 are identified by similar reference numerals. In the embodiment of FIG. 5, a multivibrator 33 is provided, which is supplied with the signal P*c'* from the control signal generator circuit 21, and with the delayed pulse P*d* from the delay circuit 22 to provide a signal such as shown in FIG. 2K whose front porch or rise is determined by the decay of the signal P*c'* and whose back porch or decay is determined by the fall of the pulse P*d*, and the resulting signal is applied to the flip-flop circuit 24. In such a case, the flip-flop circuit 24 always produces the switching signal P*s* such as shown in FIG. 2G and does not ever produce the signal depicted in FIG. 2H.

With the magnetic recording and reproducing device of this invention, at any time during recording, the video signal is applied to only one rotary magnetic head engaging the magnetic tape 11, as previously described. Consequently, during reproduction of the recorded signal from the magnetic tape 11, the reproduced outputs of the rotary magnetic heads 8*a* and 8*b* are applied to a demodulator circuit 36 through amplifier circuits 18*a* and 18*b*, as shown in FIG. 1, to obtain reproduced output signals at an output terminal 37. There is no need for providing a circuit for removing the signal at the joint of the reproduced signals, that is, the signal appearing in the overlapping period from $t_1$ to $t_2$ illustrated in FIGS. 2A and 2B. This permits simplification of the entire circuit construction, especially of the reproducing device.

Further, in accordance with the present invention, switching of the video signal to be recorded from one rotary magnetic head to the other during recording operation is controlled in accordance with the vertical synchronizing signal of the video signal to be recorded and has substantially no fluctuation in time relative thereto, that is, such control is effected by the switching signal based upon the vertical synchronizing signal separated from the video signal by the synchronizing signal separator circuit 15. This enables switching of the video signal from one head to the other at a predetermined time and hence ensures that a stable reproduced picture will be obtained. For example, when the time required for switching is of the order of the horizontal blanking signal period, the switching is likely to be made in the vertical blanking signal period even if the variation of the switching position is slight. If the switching signal is formed by making use of the signal from the control signal generator circuit 21 in place of the vertical synchronizing signal separated by the synchronizing signal separator circuit 15, the signal from the circuit 21 is not exactly the same as the vertical synchronizing signal in the strict sense of the word because of possible variations in the rotation of the rotary shaft 19 of the rotary head assembly 1, and accordingly the use of such signal will cause the switching to be effected at a position shifted slightly from the predetermined one. In accordance with the present invention, however, the switching is achieved at the predetermined position without fail.

In addition, a no-signal period in the reproduced video signal is avoided by slightly overlapping, in time, the recording of the video signals by the two heads through the use of switching signals which are partly overlapped as in the foregoing example. If the switching of the video signal from one to the other of the magnetic heads 8*a* and 8*b* is not effected in overlapping relation, there is the possibility that the termination of recording by one magnetic head and the start of recording by the other head will not coincide in time with each other, for example, due to variation in the stretch of the magnetic tape 11, and this will introduce a no-signal period, that is, the so-called signal dropout. The signal dropout causes the reproduced picture to be very disturbing to the viewer. On the other hand, in the case of partly overlapped signals, they have substantially the same information content and consequently the reproduced picture is not as adversely affected, particularly when the overlapped portion is very short, for example, shorter than one horizontal signal period, that is, several microseconds in practice. Since the switching signal is formed from a signal exactly synchronized with the synchronizing signal, such very short overlapped portion is adequate to ensure against signal dropout. Moreover, gradual switching eliminates the possibility of magnetization of the rotary magnetic heads as above described.

In the foregoing the switching signal is produced from the output of the synchronizing signal separator circuit 15 but it may be obtained from a synchronizing signal source located in a broadcasting station. Although the foregoing example employs two rotary magnetic heads, three or more rotary magnetic heads may be used. Further, although the switching is effected in the vertical blanking signal period in the foregoing, it may be achieved in the horizontal blanking signal period, in which case avoidance of fluctuation of the time for switching is of prime importance.

Figure 6:
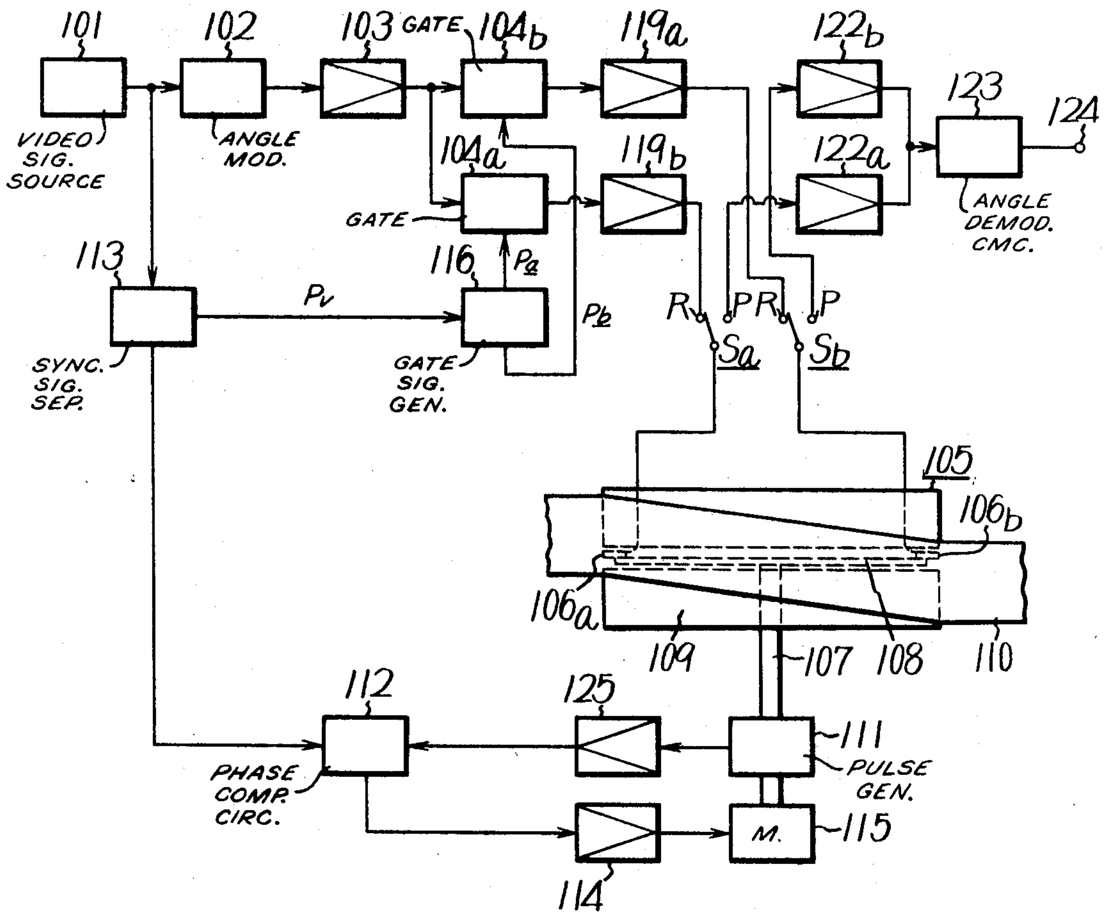
FIG. 6 is a block diagram showing another example of a magnetic recording and reproducing device according to this invention.

In FIG. 6 there is shown another example of this invention. Reference numeral 101 indicates a source of a video signal which is applied to an angle-modulator circuit 102 to provide an angle-modulated signal, which is fed through an amplifier circuit 103 to gate circuits 104*a* and 104*b*. The outputs of the gate circuits 104 *a* and 104*b* are respectively applied to rotary magnetic heads 106*a* and 106*b* of a rotary magnetic head assembly 105 through amplifier circuits 119*a* and 119*b* and recording contacts R of recording and reproducing changeover switches S*a* and S*b*. The rotary magnetic heads 106*a* and 106*b* are mounted on a support 108 affixed to a rotary shaft 107 and are spaced apart at an angular distance of 180°. Further, a cylindrical guide member 109 is disposed above and below the rotational plane of the rotary magnetic heads 106*a* and 106*b* coaxially with the rotary shaft 107, and a magnetic tape 110 is directed around a 180° portion of the guide member 109 obliquely to the rotary shaft 107, so that the rotary magnetic heads 106*a* and 106*b*, when in contact with the magnetic tape 110, form or trace skew magnetic tracks thereon. Mounted on the rotary shaft 107 is a pulse generator 111, the output pulse of which is applied to a phase comparator circuit 112 through an amplifier circuit 125. One portion of the video signal from the signal source 101 is fed to a synchronizing signal separator circuit 113, from which a separated vertical synchronizing signal is supplied to the comparator circuit 112. The output of the comparator circuit 112 is applied through a servo amplifier circuit 114 to a motor 115 for driving the rotary shaft 107. Thus, the video signal is sequentially recorded on the magnetic tape 110 alternately by the rotary magnetic heads 106*a* and 106*b* while the latter form or trace one-field tracks in synchronism with the vertical synchronizing signal of the video signal.

Figure 7:
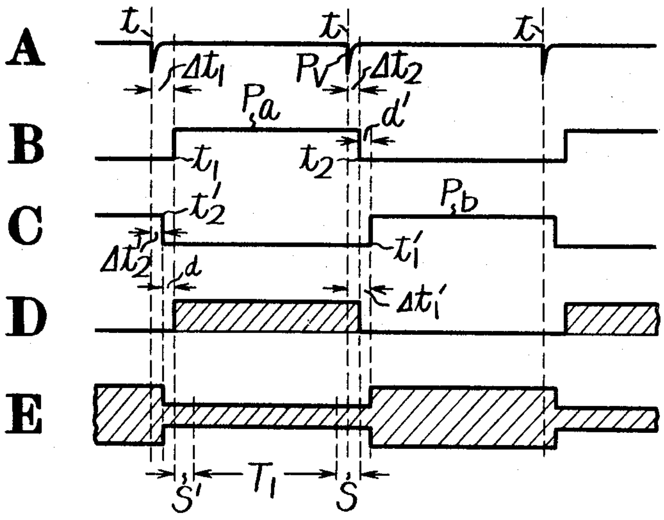
FIG. 7 is a waveform diagram for explaining the magnetic recording and reproducing device depicted in FIG. 6.

In the present embodiment of the invention, one portion of the output of the synchronizing signal separator circuit 113 is applied to a gate signal generator circuit 116 to produce two gate signals of opposite polarities having a cycle of one frame and each corresponding to one field. In this case the rise and decay points of the two gate signals are always spaced apart so as not to overlap in anticipation of the variation of stretch of the magnetic tape 110, wow and flutter of the rotary magnetic heads and so on. For example, a vertical synchronizing pulse P*v* as shown in FIG. 7A is obtained from the synchronizing signal separator circuit 113 and controls the generation of a gate signal P*a* as shown in FIG. 7B by the gate signal generator circuit 116, which signal P*a* rises at a time $t_1$ delayed a time $\Delta t_1$ behind the vertical synchronizing pulse P*v* and decays at a time $t_2$ delayed a time $\Delta t_2$ shorter than $\Delta t_1$ behind a subsequent vertical synchronizing pulse, the resulting gate signal P*a* being applied to the gate circuit 104*a*. Further, the gate signal generator circuit 116 produces a gate signal P*b* such as is depicted in FIG. 7C which rises at a time $t_1'$ delayed a time $\Delta t_1'$ longer than $\Delta t_2$ behind the vertical synchronizing pulse P*v* immediately prior to the decay of the gate signal P*a* and decays at a time $t_2'$ delayed a time $\Delta t_2'$ shorter than $\Delta t_1'$ behind a subsequent vertical synchronizing pulse P*v*. The gate signal P*b* is fed to the gate circuit 104*b*. In this case $\Delta t_1 > \Delta t_2$. The circuit construction can be simplified by selecting $\Delta t_1 = \Delta t_1$ and $\Delta t_2 = \Delta t_2'$. The intervals between the rise and fall of the gate signals P*a* and P*b* ($d = \Delta A t_1 - \Delta_2'$ and $d' = \Delta t_1' \Delta t_2$) may be selected to be zero independently of the stretch of the tape 110 and wow and flutter of the rotary magnetic heads 106*a* and 106*b*, but it is preferred that these intervals be selected to be as short as possible, that is, less than several horizontal signal periods, for example, several microseconds. In addition, it is preferred that the rise and decay of the gate signals occur in the blanking signal periods following the vertical synchronizing pulses.

Figure 8:
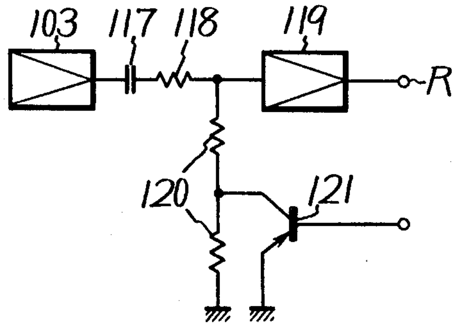
FIG. 8 is a connection diagram illustrating one example of a switching circuit used in FIG. 6.

In the control of the gate circuits 104*a* and 104*b* with the gate signals P*a* and P*b* either one or the other of the gate circuits is controlled to be selectively switched completely to its on and off states, but the other gate circuit is controlled so that it is not completely turned off when in its off state, whereby to leak a portion of the signal applied thereto. In FIG. 8 there is illustrated, by way of example, such a gate circuit in which the amplifier circuit 103 is connected to the contact R of the changeover switch S*b* through a circuit including a capacitor 117, a resistor 118 and an amplifier 119. The connecting point of the resistor 118 with the amplifier 119 is grounded through a resistor 120 and the intermediate point of the resistor 120 is grounded through the collector and emitter of a transistor 121, with the gate signal P*b* being supplied to the base of the transistor 121. In such a case, while the gate signal P*b* is "on" the transistor 121 is held in its nonconductive state and the output of the amplifier circuit 103 appears with a relatively great level at the contact R of the switch S*b*. In the "off" period of the gate signal P*b* the transistor 121 is rendered conductive to attenuate the output of the amplifier circuit 103, causing a decrease in the output level at the contact R of the switch S*b*. As a result of this, an output signal such as shown in FIG. 7E issues from the gate circuit 104*b*. On the other hand, in the case of the gate circuit 104*a*, the circuit of FIG. 8 is modified so that the collector of the transistor 121 is connected to the connecting point between the resistors 118 and 120 and the latter are selected such that the output of circuit 104*a* may be substantially zero in the "off" period of the gate signal P*a*. Accordingly, an output such as is depicted in FIG. 7D is obtained from the gate circuit 104*a*. In FIG. 7E, the period $T_1$ during which the level of the output of the gate circuit 104*b* has been lowered is a period during which the rotary magnetic head 106*b* supplied with this output is out of contact with the magnetic tape 110, and the period $T_1$ neither agrees with nor overlaps the "off" period of the output (FIG. 7D) of the other gate circuit 104*a* irrespective of any variation of the stretch of the tape 110, wow and flutter of the rotary magnetic heads and so on.

With the arrangement described in the foregoing, the signal depicted in FIG. 7D is recorded on the magnetic tape 110 by the rotary magnetic head 106*a* and the signal shown in FIG. 7E is recorded on the tape 110 by the other magnetic head 106*b* except for that portion of the signal in the period $T_1$. For the reproduction of the signals thus recorded, the changeover switches S*a* and S*b* are shifted to engage to playback contacts P and the reproduced outputs of the magnetic heads 106*a* and 106*b* are respectively supplied to an angle demodulator circuit 123 through amplifier circuits 122*a* and 122*b*, thereby to obtain a series demodulated video signals from an output terminal 124 of the demodulator circuit 123. As a matter of course, servo or the like means are employed to cause the rotary magnetic heads 106*a* and 106*b* to accurately scan the magnetic tracks on the magnetic tape 110. Thus, the reproduction operation does not need any switching circuits and may be achieved by mere angle-demodulation of the combined outputs of both rotary magnetic heads 106*a* and 106*b*.

The reproduced outputs of both rotary magnetic heads 106*a* and 106*b* are produced in the form of the signal depicted in FIG. 7D and the signal shown in FIG. 7E excluding the period $T_1$, and the signal is continuously obtained from one or the other of the heads. The overlapped portions S and S′ of the signals from the two heads never become zero in spite of variation of stretch of the magnetic tape 110 and wow and flutter of the rotary magnetic heads, whereby eliminating the possibility of introducing a no-signal period or signal dropout in the composite signal of the two magnetic heads. In addition, although the signals are overlapped, the level of one signal (the signal depicted in FIG. 7E in the illustrated example) is lower than (preferably one-third) that of the other signal in the overlapped portions S and S′, so that there is no possibility of generating beats in the composite signal. Further, even if the relatively large level portions of the two signals draw near due to the variation in the tape stretch, or wow and flutter of the heads in the overlapped portions S and S′, such large level portions of the signals do not ever overlap and accordingly no beat is produced. Between the large level portions of the two signals, the level of the composite signal lowers but this only causes a little decrease in the SN ratio and does not introduce serious troubles such as beat or a no-signal period.

In the foregoing, the gate signals are produced by applying the vertical synchronizing signal to the gate signal generator circuit 116 but the output of the pulse generator circuit 111 may be used for this purpose. Although the video signal has been described as being recorded on the magnetic tape with successive fields being recorded respectively in the tracks scanned alternately by the rotary magnetic heads 106*a* and 106*b*, the video signal may be recorded with each track accepting the portion of the signal corresponding to a frame rather than a field. Further, it is also possible to record the video signal with one field or frame thereof being recorded in each track scanned by one rotary magnetic head, and with the vertical synchronizing signals recorded by the other rotary magnetic head in the tracks scanned by the latter. Although the present invention has been described in connection with recording and reproducing devices employing two rotary magnetic heads, three or more heads may be used, in which case the video signal is switchingly applied to the heads in a sequential order during recording of the video signal. In the foregoing, the level of the signal fed to one magnetic head 106*b* has been described as being lowered so as to make the record levels of the two signals different from each other in the overlapped periods S and S′, but it is also possible that the level of the signal supplied to the head 106*b* may be greatly increased to lower the level of the recorded signal by making use of the recording characteristics of the magnetic medium.

It will be apparent that many modifications and variations may be effected without departing from the scope of the novel concepts of this invention.

We claim:

1. A device for magnetically recording and reproducing video signals on a magnetic tape, which video signals include vertical synchronizing signals, said device comprising a plurality of rotary magnetic heads, means to rotate said heads in synchronism with said vertical synchronizing signals, means guiding the magnetic tape in a path at which the tape is alternately contacted by said heads along skew tracks successively traced by the heads on said tape, means operative during recording operation of the device for supplying the video signals to said heads for recording of all of the video signals by the heads in the respective skew tracks successively traced thereby and including switching means having a plurality of states corresponding in number to the number of said heads and in each of which said video signals are supplied to a respective one of said heads, switching control means operated by said vertical synchronizing signals of the video signals during said recording operation of the device and successively alternating said states of said switching means to cause successive portions of said video signals to be recorded in the tracks traced by the respective heads, and means operative during the reproducing operation of said device to continuously combine the entire outputs of said heads and thereby provide a combined output constituted by the successive portions of said video signals reproduced alternately by said heads.

2. A device according to claim 1, in which said switching control means includes means to gradually terminate each of said states of said switching means so that the supplying of said video signals to each of said heads is gradually interrupted by the gradual termination of the respective state.

3. A device according to claim 1, in which there are two of said heads, and said switching control means is operated by said vertical synchronizing signals to cause odd number fields of said video signals to be recorded by one of said heads in said skew tracks traced thereby and even number fields to be recorded by the other of said heads in the skew tracks that are traced by said other head intermediate said tracks traced by said one head.

4. A device according to claim 3, in which said heads are angularly spaced from each other so as to simultaneously contact the tape when tracing the beginning and end parts of respective adjacent tracks, and said switching control means includes means by which said states of the switching means are alternated in overlapping relation with each period of overlap being of the order of the horizontal period of said video signal and occurring during a vertical blanking period of said video signals.

5. A device according to claim 1, in which said heads are angularly spaced from each other so as to simultaneously contact the tape when tracing the beginning and end parts of respective adjacent tracks, said switching control means includes means by which said states of the switching means are alternated with time intervals between the successive states, and said switching means includes means operative in only one of said states to supply the video signals at a predetermined level to one of said heads and means operative in another of said states to supply the video signals at substantially said predetermined level to another of said heads and being otherwise operative to supply the video signals to said other head at a level substantially lower than said predetermined level.

6. A device according to claim 5, in which said switching control means includes means by which said time intervals between the successive alternated states are made to occur in vertical blanking periods of the video signals.